United States Patent [19]
de Jong

[11] Patent Number: 5,343,681
[45] Date of Patent: Sep. 6, 1994

[54] CUTTER BLADE FOR A ROTARY CUTTER

[75] Inventor: Gerard de Jong, Natal Province, South Africa

[73] Assignee: Falcon Equipment Limited, Howick, South Africa

[21] Appl. No.: 5,438

[22] Filed: Jan. 19, 1993

[51] Int. Cl.$^5$ .............................................. A01D 34/64
[52] U.S. Cl. ....................................... 56/255; 56/295; 56/DIG. 17
[58] Field of Search ........ 56/255, 295, 17.5, DIG. 17, 56/DIG. 20; 460/112, 113

[56] References Cited
U.S. PATENT DOCUMENTS

| | | |
|---|---|---|
| 3,184,907 | 5/1965 | Harloff ................................... 56/295 |
| 3,482,380 | 12/1969 | Stair ........................................ 56/295 |

FOREIGN PATENT DOCUMENTS 231016  3/1959  Australia ................................ 56/295

*Primary Examiner*—Terry Lee Melius
*Attorney, Agent, or Firm*—Paul M. Denk

[57] ABSTRACT

The invention relates to a cutter blade for use on a rotary cutter of the tractor drawn type. Rotary cutters of this type usually have three or four cutter blades rotatably mounted on a blade carrier that can be rotated to induce cutter blade rotation and thereby permit cutting of grass. The cutter blade of the invention has a curved cutting edge with the section including the cutting edge being off-set with respect to the section whereby the blade is mounted on its blade carrier. The use of such cutter blades on a rotary cutter improves cutting efficiency, provides for an increased blade life and reduces the power requirements of the rotary cutter with which the blades are associated.

24 Claims, 2 Drawing Sheets

CUTTER BLADE FOR A ROTARY CUTTER

This invention relates to rotary cutters. More particularly, the invention relates to a cutter blade for a rotary cutter that is used for cutting grass, and like matter.

The rotary cutter to which the present invention relates is a tractor drawn rotary cutter and includes an operatively horizontally disposed blade carrier that is mounted for rotation, about an axis of rotation that is operatively vertically disposed, on the body of the rotary cutter. The blade carrier can be mechanically linked by a power-take-off shaft to a power-take-off of a tractor, to be rotated thereby. The blade carrier carries a plurality, usually three or four, cutter blades that are mounted for free rotation on the blade carrier, being freely rotatable about axes of rotation that are parallel to the axis of rotation of the blade carrier. The blade carrier as above envisaged can be in the form of a disc, a beam, any other substantially planar member, or the like, the general configuration of such a blade carrier and its cutter blades in association with a rotary cutter, as described above, being well known and not being described in further detail herein.

Each cutter blade of a rotary cutter of the above described type comprises an elongated flat bar of which one end is rotatably mounted on the blade carrier of the rotary cutter. The direction of rotation of the blade carrier will determine the direction of rotation of the cutter blade mounted thereon and, as such, one elongated side edge of each flat bar will form a leading edge, the said leading edge defining a linear sharpened region, whereby grass is cut.

Accordingly, by the driven rotation of the blade carrier of the rotary cutter, centrifugal forces acting on the cutter blades will result in rotation thereof about their axes of rotation, the cutter blades thereby providing for cutting of grass. Because of the linear cutting edges of the cutter blades, the effective angle of attack of the cutting edges on grass being cut will continuously vary, as determined by the resistance of grass being cut, this variation in angle of attack providing for the blades to perform either a "chopping" action on grass being cut, or a slicing action which will decrease in efficiency as the angle between the longitudinal axis of each blade and a radial line extending through the centre of the blade carrier, increases. This can result in relatively inefficient cutting of grass and increased power and fuel requirements. Also, because of the linear configuration of the cutting edge of each cutter blade and the mode of cutting, as described, wear on each cutter blade is substantial, particularly at the end of each cutter blade remote from its axis of rotation.

Accordingly, it is an object of this invention to provide a cutter blade for a rotary cutter which has improved wear characteristics.

It is a further object of this invention to provide a cutter blade for a rotary cutter having an improved cutting efficiency, thereby to reduce the power requirements of the rotary cutter.

According to the invention there is provided a cutter blade for a rotary cutter, which is formed of an elongated flat bar having substantially parallel longitudinal side edges and defining a longitudinal axis midway between and parallel to said side edges, the flat bar being formed to define a mounting section adjacent one end thereof that can be rotatably mounted on a blade carrier of a rotary cutter, a cutting section adjacent the other end thereof that defines a sharpened cutting edge along one end of its side edges, and an intermediate section that links the mounting section to the cutting section and that is cranked to off-set the plane of the cutting section with respect to the mounting section, the side edge portion of the flat bar is formed to define the cutting edge section being curved operatively rearwardly with respect to a straight line defined by the remainder of the side edge of the flat bar including the said side edge portion, the curvature of the side edge portion defining the cutting edge being such that the line defining the cutting edge defines an arc of a circle with the center of the circle being defined along a line dividing the cutting section and the intermediate section of the flat bar and which is perpendicular to the longitudinal axis of the straight section of the flat bar along the mounting section and intermediate section, the ratio of the radius of the circle and the length of the cutting section being between 2:1 and 1.5:1.

The off-set of the cutting section of the flat bar with respect to the mounting section may be larger on the side edge portion side that defines the cutting edge than on the opposite side thereof, the cutting section being inclined with respect to the mounting section about an axis defined by the longitudinal axis of the elongated flat bar. The said angle of inclination of the cutting section of the flat bar with respect to the mounting section preferably is between 3° and 10° and, typically, is 6,5°.

The mounting section of the flat bar conveniently has a hole therein near the end of the bar, which permits mounting of the blade on a blade carrier of a rotary cutter by a bolt and nut arrangement. As such, the minimum off-set between the mounting section and the cutting section is larger than the maximum distance the said bolt and nut arrangement can project on the blade side of the cutter blade, when mounted on a blade carrier.

Still further, the overall length of the flat bar forming the cutter blade may be determined by the dimensions of the blade carrier on which the blade can be mounted, the length of the blade being such that a plurality of blades mounted on the carrier are freely rotatable with respect to the carrier, without interference with one another.

The ratio of the overall flat bar length to the length of the cutting section may be between 2:1 and 4:1, whereas the ratio of the overall flat bar length to the flat bar width may be approximately 5:1. Still further, the thickness of the flat bar may be between 5 mm and 15 mm.

According to a preferred embodiment of the invention, the curvature of the cutting section of the flat bar may have been formed by a rolling process, whereas the cutting edge may have been formed by forging.

The invention extends also to a rotary cutter for cutting grass, and like matter, which comprises a body that can be hitched to a tractor, a blade carrier mounted on the body for rotation about an operatively vertical axis, connector means for connecting the blade carrier to the power take-off of a tractor to be rotatable thereby, and a plurality of cutter blades mounted for free rotation on the blade carrier, each cutter blade being formed of an elongated flat bar having substantially parallel, longitudinal side edges and defining a longitudinal axis midway between and parallel to the side edges, the flat bar having a mounting section adjacent one end thereof where the flat bar is rotatably mounted on the blade carrier, a cutting section adjacent the other end thereof that defines a sharpened cutting edge along one of its side edges, and an intermediate section that links the mounting section to the cutting section and that is cranked to off-set the plane of the cutting section with respect to the plane of the mounting section, the side edge portion of the bar that is formed to define the cutting edge being curved operatively rearwardly with respect to a straight line defined by the remainder of the side edge of the flat bar including the said side edge portion.

Each cutter blade of the rotary cutter particularly is a cutter blade having the features of the cutter blade, in accordance with the present invention, as are hereinabove defined.

Further features of the cutter blade of the invention and of the rotary cutter, are described in more detail hereinafter with reference to an example of the invention illustrated by way of the accompanying diagrammatic drawings. In the drawings.

Figure 1:
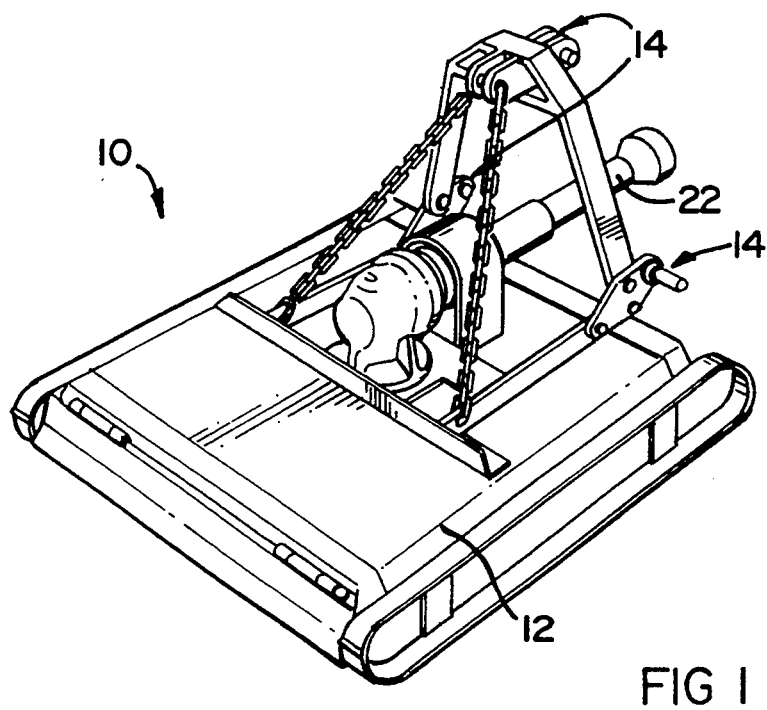
FIG. 1 shows a three-dimensional view of a rotary cutter, in accordance with the invention.
Figure 2:
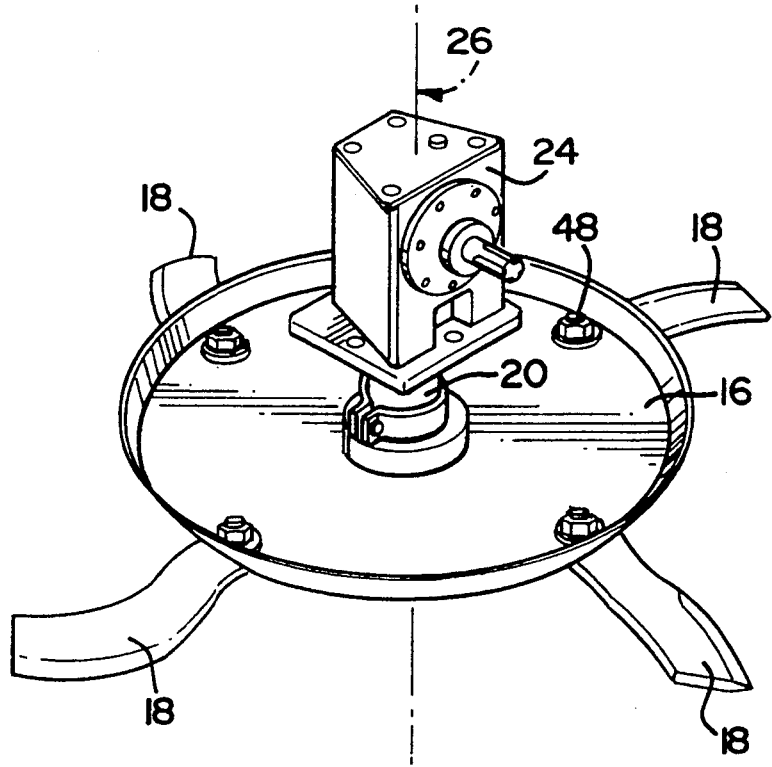
FIG. 2 shows a three-dimensional view of a blade carrier and its associated cutter blades, forming a part of the rotary cutter of FIG. 1.

Referring initially to FIGS. 1 and 2 of the drawings, a rotary cutter, in accordance with the invention, is designated generally by the reference numeral 10. The rotary cutter 10 includes a main body 12 that can be hitched to a tractor by suitable hitching formations 14. The body 12 serves as a housing for surrounding a blade carrier, which in the configuration shown is in the form of a blade disc 16, and cutter blades 18, the cutter blades 18 being rotatably mounted on the disc 16 in the configuration as is illustrated clearly in FIG. 2 of the drawings. The blade disc is rotatably mounted on the body 12, the disc being operatively connected to a drive shaft 20, which can be operatively connected to a tractor power-take-off by means of a power-take-off shaft 22 via a gear box 24. This arrangement provides for the rotation of the blade disc 16 about an operatively vertical axis 26, thus providing for rotation of the disc 16 in a substantially horizontal plane, with the cutter blades 18 being rotatable about axes substantially parallel to the said vertical axis 26.

The above general configuration of the rotary cutter 10 is essentially conventional as for known rotary cutters and as this does not form a part of the present invention, this is not described in any further detail herein.

Figure 4:
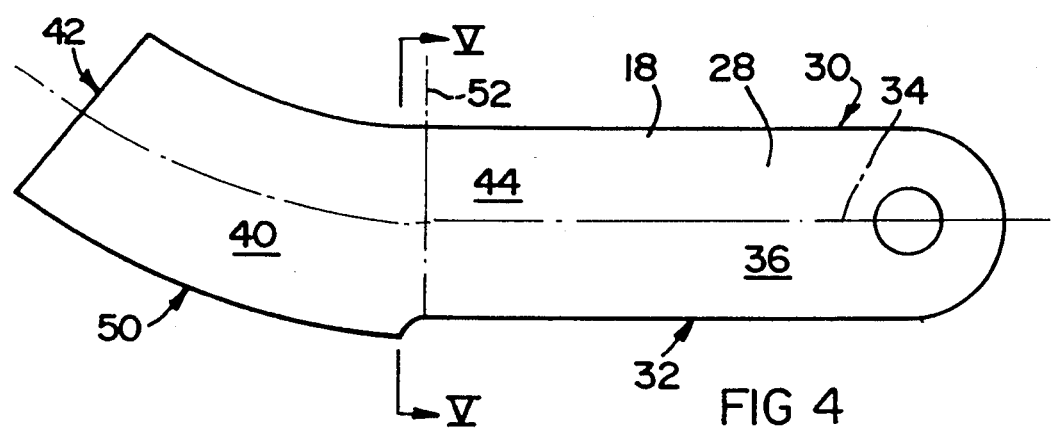
FIG. 4 shows a plan view of the cutter blade of FIG. 3.

Each cutter blade 18 of the rotary cutter 10 is formed of an elongated flat bar 28 having substantially parallel longitudinal side edges, 30 and 32 respectively, the flat bar defining a longitudinal axis 34 midway between and parallel to the said side edges (see FIG. 4).

Each cutter blade 18 is divided into a mounting section 36 adjacent one end 38 of the flat bar 28, a cutting section 40 at the other end 42 of the flat bar 28 and an intermediate section 44 that links the mounting section to the cutting section and that is cranked to off-set the plane of the cutting section 40 with respect to the plane of the mounting section 36.

The mounting section 36 of the flat bar 28 has a hole 46 defined therein near the end 38 of the flat bar whereby the cutter blade 28 is mounted on the blade disc 16 by means of a bolt and nut arrangement 48, as is illustrated clearly in FIG. 2 of the drawings.

Figure 3:
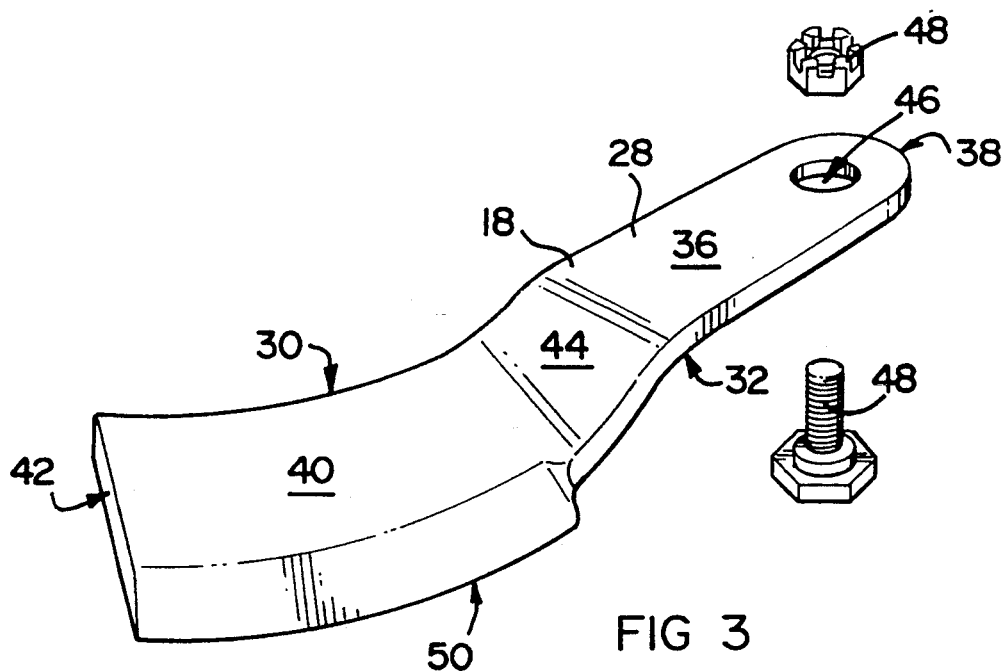
FIG. 3 shows a three-dimensional view of a cutter blade for the rotary cutter of FIG. 1, in accordance with the invention.

The cutting section 40 of the flat bar 28 on the side edge 32 side thereof defines a sharpened cutting edge 50, the cutting edge 50 being curved operatively rearwardly with respect to a straight line defined by the remainder of the side edge 32 of the flat bar 28, the curved configuration of the cutter blade 18 being illustrated clearly in FIGS. 3 and 4 of the drawings.

Figure 5:
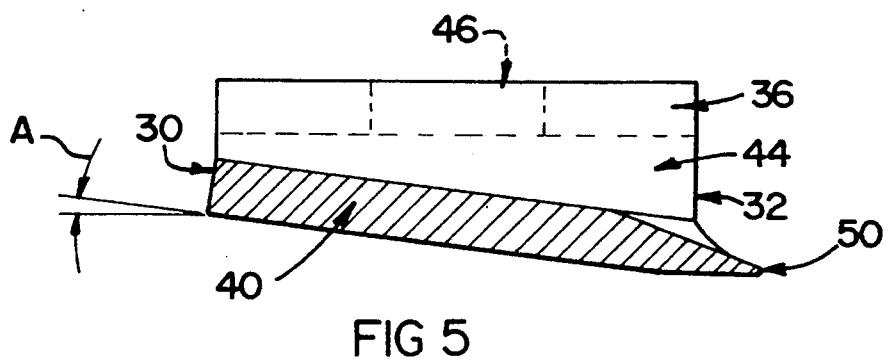
FIG. 5 shows a cross sectional end view of the cutter blade of FIG. 3 along line V—V of FIG. 4.

The off-set of the cutting section 40 of the flat bar 28 with respect to the mounting section 36 as provided by the cranked intermediate section 44, is larger on the side of the side edge 32 than on the side of the side edge 30 of the flat bar 28, the cutting section thus being inclined with respect to the mounting section about an axis defined by the longitudinal axis 34 of the flat bar 28. This angle of inclination of the cutting section 40 with respect to the mounting section 36 is illustrated clearly in FIG. 5 of the drawings and, typically, this angle of inclination A is equal to approximately 6,5°. This will provide an effective flighting of the cutter blades 18, causing an upward movement of air within the housing 12 of the rotary cutter 10 during rotation of the blade disc 16 about its shaft 20 and of the blades 18 with respect to the blade disc 16, which has the benefit described hereafter.

The line defined by the cutting edge 50 particularly defines an arc of a circle, with the centre of the circle being defined along a line 52, which divides the cutting section 40 from the intermediate section 44 of the flat bar 28 and which is perpendicular to the longitudinal axis 34 of the flat bar 28 along the straight section of the flat bar 28, being the mounting section 36 and the intermediate section 44. The radius of curvature of the line defining the cutting edge 50 is determined by the effective length of the cutting section 44 defining the cutting edge 50 and, particularly, the ratio of this radius of curvature and the effective length of the cutting section of the flat bar is between 2:1 and 1,5:1.

The overall length of the flat bar 28 forming the cutter blade 18 is determined by the dimensions of the blade disc 16 on which it is mounted, the length of the blade 18 particularly being such that a plurality of blades, when mounted on the disc 16, will be freely rotatable with respect to the disc 16 without interference with one another.

Furthermore, the ratio of the overall flat bar length to the length of the cutting section is between 2:1 and 4:1, whereas the ratio of the overall flat bar length to the flat bar width is approximately 5:1. The thickness of the flat bar 28 typically is between 5 mm and 15 mm, as will be determined by the different applications of rotary cutters.

As is envisaged above each cutter blade 18 of a rotary cutter, in accordance with the invention, will be formed in one piece of an elongated flat bar, with the curvature of the cutting section 40 and the cranking of the intermediate section 44 being provided by a rolling and pressing process, whereas the cutting edge will be formed by a forging process. Clearly, the cutter blade can be manufactured of any suitable material and, particularly, a material as is already commonly associated with cutter blades used on rotary cutters of the type envisaged herein.

By providing a rotary cutter as herein envisaged with cutter blades 18 having the features as described above, it is believed that the overall cutting efficiency of the rotary cutter will be greatly enhanced. This improved efficiency is due to the fact that the cutting edge 50, during operation of the rotary cutter 10, will perform a more effective slicing action on grass, or like matter being cut, the radius of curvature of the cutting edge 50 being such that the slicing action is facilitated for all relative positions of each cutter blade 18 with respect to the blade disc 16.

Blades having conventional straight line cutting edges either perform a chopping action on grass being cut, which is very inefficient, or perform a slicing action with the angle of attack on grass being cut varying constantly, which, once again, is inefficient. Furthermore, because of the curved configuration of the cutting edge 50, the effective length of the cutting edge is increased when compared to a conventional cutter blade having a straight line cutting edge and, thereby, cutting efficiency is further enhanced.

Because of the improvement in cutting efficiency as provided by the cutter blades 18, the power requirements of the rotary cutter 10 are effectively reduced when compared to conventional rotary cutters having conventional blades and this will result in a saving in the fuel consumption of a tractor with which the rotary cutter 10 is used.

The minimum off-set of the cutting section 40 with respect to the mounting section 36 of the flat bar 28, as provided by the intermediate section 44, will be larger than the maximum distance the bolt and nut arrangement 48 can project on the blade side of the cutter blade when mounted on the blade disc 16, thus ensuring that the bolt and nut arrangement remains above the ordinary cutting level as provided for by the cutter blades 18. Thereby, wear on the bolt and nut arrangement is reduced, which could otherwise cause failure of the bolt and nut arrangement, which can be very dangerous.

Also, because of the flighting of the cutting sections 40 of the blades 18 as described above, the upward air movement created within the housing 12 will cause effective lifting of grass being cut, once again improving the cutting efficiency of the rotary cutter 10.

Still further, by providing each cutter blade 18 with the curved cutting edge 50 as defined, the wear characteristics of each cutter blade 18 is improved when compared with the wear characteristics of conventional cutter blades defining linear cutting edges, particularly near the end of the cutting edge 50 remote from the end where the cutter blade 18 is mounted on a blade disc.

It is envisaged that the exact configuration of the cutting blade 18 can be varied in various different respects, while still incorporating the features of the cutter blade as are hereinabove described and defined and the invention extends also to such alternative configuration cutter blades for use on rotary cutters.

I claim:

1. A cutter blade for a rotary cutter which is formed of an elongated flat bar having a substantially parallel longitudinal side edges and defining a longitudinal axis midway between and parallel to said side edges, the flat bar being formed to define a mounting section adjacent one end thereof that can be rotatably mounted on a blade carrier of a rotary cutter, a cutting section adjacent the other end thereof that defines a sharpened cutting edge along one of its side edges, and an intermediate section that links the mounting section to the cutting section and that is cranked to offset the plane of the cutting section with respect to the plane of the mounting section, the side edge portion of the flat bar that is formed to define the cutting edge being curved operatively rearwardly with respect to a straight line defined by the remainder of the side edge of the flat bar including the said side edge portion, the curvature of the side edge portion defining the cutting edge being such that the line defining the cutting edge defines an arc of a circle with the centre of the circle being defined along a line dividing the cutting section and the intermediate section of the flat bar and which is perpendicular to the longitudinal axis of the straight section of the flat bar along the mounting section and the intermediate section, the ratio of the radius of the circle and the length of the cutting section being between 2:1 and 1.5:1.

2. A cutter blade as claimed in claim 1, in which the off-set of the cutting section of the flat bar with respect to the mounting section is larger on the side edge portion side that defines the cutting edge than on the opposite side thereof, the cutting section being inclined with respect to the mounting section about an axis defined by the longitudinal axis of the elongated flat bar.

3. A cutter blade as claimed in claim 2, in which the angle of inclination of the cutting section of the flat bar with respect to the mounting section is between 3° and 10°.

4. A cutter blade as claimed in claim 3, in which the said angle of inclination is 6,5°.

5. A cutter blade as claimed in claim 1, in which the mounting section of the flat bar has a hole therein near the end of the bar which permits mounting of the blade on a blade carrier of a rotary cutter by a bolt and nut arrangement.

6. A cutter blade as claimed in claim 5, in which the minimum off-set between the mounting section and the cutting section is larger than the maximum distance the said bolt and nut arrangement can project on the blade side of the cutter blade, when mounted on a blade carrier.

7. A cutter blade as claimed in claim 1, in which the overall length of the flat bar forming the cutter blade is determined by the dimensions of the blade carrier on which the blade can be mounted, the length of the blade being such that a plurality of blades mounted on the carrier are freely rotatable with respect to the carrier, without interference with one another.

8. A cutter blade as claimed in claim 7, in which the ratio of the overall flat bar length to the length of the cutting section is between 2:1 and 4:1.

9. A cutter blade as claimed in claim 7, in which the ratio of the overall flat bar length to the flat bar width is approximately 5:1.

10. A cutter blade as claimed in claim 1, in which the thickness of the flat bar is between 5 mm and 15 mm.

11. A cutter blade as claimed in claim 1, in which the curvature of the cutting section of the flat bar has been formed by a rolling process.

12. A cutter blade as claimed in claim 1, in which the cutting edge has been formed by forging.

13. A rotary cutter for cutting grass, and like matter, which comprises a body that can be hitched to a tractor, a blade carrier mounted on the body for rotation about an operatively vertical axis, connector means for connecting the blade carrier to the power-take-off of a tractor to be rotatable thereby, and a plurality of cutter blades mounted for free rotation on the blade carrier, each cutter blade being formed of an elongated flat bar having substantially parallel, longitudinal side edges and defining a longitudinal axis mid-way between and parallel to the side edges, the flat bar being formed to define a mounting section adjacent one end thereof where the flat bar is rotatably mounted on the blade carrier, a cutting section adjacent the other end thereof that defines a sharpened cutting edge along one of its side edges, and an intermediate section that links the mounting section to the cutting section and that is cranked to off-set the plane of the cutting section with respect to the plane of the mounting section, the side edge portion of the flat bar that is formed to define the cutting edge being curved operatively rearwardly with respect to a straight line defined by the remainder of the side edge of the flat bar including the said side edge portion, the curvature of the side edge portion defining the cutting edge being such that the line defining the cutting edge defines an arc of a circle with the centre of the circle being defined along a line dividing the cutting section and the intermediate section of the flat bar and which is perpendicular to the longitudinal axis of the straight section of the flat bar along the mounting section and the intermediate section, the ratio of the radius of the circle and the length of the cutting section being between 2:1 and 1.5:1.

14. A rotary cutter as claimed in claim 13, in which the off-set of the cutting section of each flat bar with respect to the mounting section is larger on the side edge portion side that defines the cutting edge than on the opposite side thereof, the cutting section being inclined with respect to the mounting section about an axis defined by the longitudinal axis of the elongated flat bar.

15. A rotary cutter as claimed in claim 14, in which the angle of inclination of the cutting section of each flat bar with respect to the mounting section is between 3° and 10°.

16. A rotary cutter as claimed in claim 15, in which said angle of inclination is 6,5°.

17. A rotary cutter as claimed in claim 13, in which each cutter blade is mounted on the blade carrier by a bolt and nut arrangement passing through holes in the blade carrier and in the mounting section of each flat bar forming a cutter blade.

18. A rotary cutter as claimed in claim 17, in which the minimum off-set between the mounting section and the cutting section of each flat bar forming a cutter blade is larger than the distance each said bolt and nut arrangement projects on the blade side of each cutter blade.

19. A rotary cutter as claimed in claim 13, in which the overall length of each flat bar forming a cutter blade is determined by the dimensions of the blade carrier, the cutter blades being freely rotatable on the blade carrier without interference with one another.

20. A rotary cutter as claimed in claim 19, in which the ratio of the overall flat bar length to the length of the cutting section of each flat bar is between 2:1 and 4:1.

21. A rotary cutter as claimed in claim 19, in which the ratio of the overall flat bar length to the flat bar width of each flat bar is approximately 5:1.

22. A rotary cutter as claimed in claim 13, in which the thickness of each flat bar forming a cutter blade is between 5 mm and 15 mm.

23. A rotary cutter as claimed in claim 13, in which the curvature of the cutting section of each flat bar forming a cutter blade has been formed by a rolling process.

24. A rotary cutter as claimed in claim 13, in which the cutting edge of each cutter blade has been formed by forging.

* * * * *